Dec. 9, 1941.                 R. MAIER                 2,265,180
PROCESS FOR CONVERTING METALS AND THE LIKE
Original Filed June 7, 1937            3 Sheets-Sheet 1
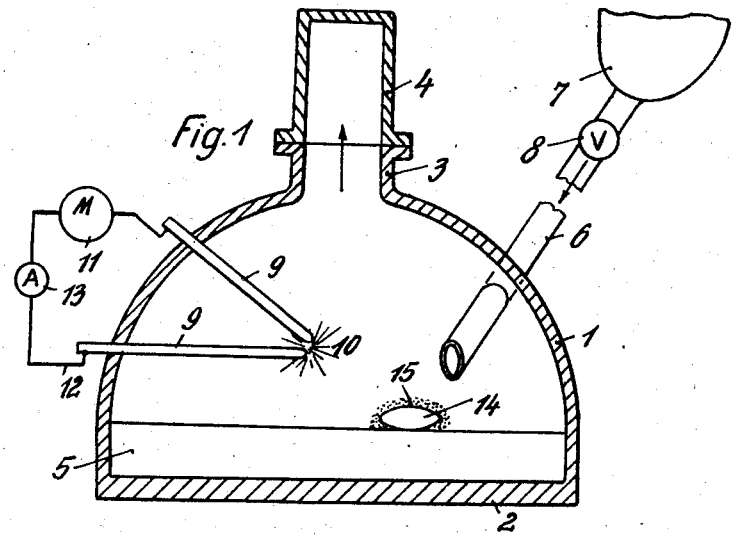
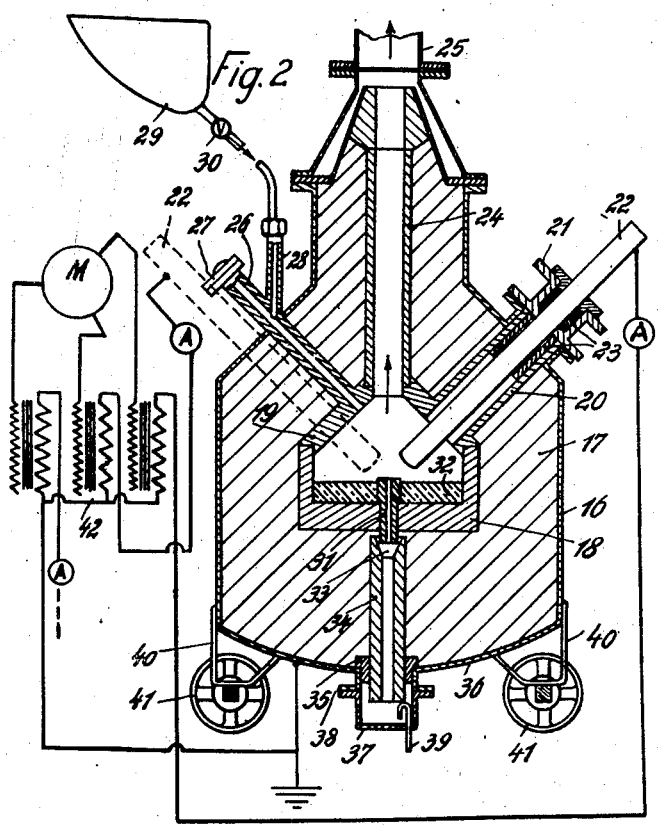
INVENTOR
RUDOLF MAIER
BY
ATTORNEY Dec. 9, 1941.  R. MAIER  2,265,180
PROCESS FOR CONVERTING METALS AND THE LIKE
Original Filed June 7, 1937  3 Sheets-Sheet 2

INVENTOR
RUDOLF MAIER
BY
ATTORNEY

Dec. 9, 1941.   R. MAIER   2,265,180
PROCESS FOR CONVERTING METALS AND THE LIKE
Original Filed June 7, 1937   3 Sheets-Sheet 3

INVENTOR
RUDOLF MAIER
BY
ATTORNEY

Patented Dec. 9, 1941

2,265,180

UNITED STATES PATENT OFFICE 2,265,180

PROCESS FOR CONVERTING METALS AND THE LIKE

Rudolf Maier, Stuttgart, Germany, assignor to Elektro-Metallurgische Apparatebau Aktiengesellschaft, Zurich, Switzerland, a corporation of Switzerland Original application June 7, 1937, Serial No. 146,748. Divided and this application August 24, 1939, Serial No. 291,689

6 Claims. (Cl. 75—20)

The present invention relates to a process for converting alloys, metal alloys, metal compounds, such as ores or similar substances into the vapor state to render them either chemically unchanged or, after dissociation or reaction with other substances, suitable for further processing, for example, precipitation in the form of a very fine powder, decomposition into their components, separation of certain admixtures, and the like. It has been found that these processes can be carried on far better and far cheaper by the use of superheated vapors. Consequently, the process of the present invention can be adapted to a great variety of purposes.

The present invention provides a process in which substances to be treated are introduced into a furnace or crucible in small amounts at any one instant. The crucible is provided with a substantially plane surface onto which the substances are fed in small amounts and prevented from forming greater coherent complexes such as heaps or pools of the substances to be treated. Preferably, the substantially plane surface is subjected directly to the heat of the furnace or crucible and provides an unobstructed surface on which the particles of the substance to be treated are free to move.

It is an object of the present invention to provide a process for the vaporization of metals, metal alloys, metal compounds and the like in which the individual particles or grains of the substance to be treated are separately subjected to the action of heat.

It is another object of the present invention to provide a process in which only such amounts of substances to be treated are introduced into the furnace or crucible as are substantially equivalent to the amounts vaporized.

It is a further object of the present invention to provide a process in which such high temperatures are employed that due to spontaneous vaporization, the individual particles or small accumulations of the substances to be treated are completely surrounded by vapor originating from the substances.

The present invention also contemplates a process in which small, discrete particles of a substance to be treated are subjected to temperatures substantially above the boiling point of the substances.

The present invention likewise contemplates a process for vaporizing metals, metal alloys, metal compounds and the like in which temperatures above those at which the Leidenfrost phenomena becomes effective are employed.

Other objects and advantages will become apparent from the following description taken in conjunction with the drawings, in which Fig. 1 is a diagrammatic sectional view of a crucible embodying the principles of the present invention;

Fig. 2 is a longitudinal vertical section through a crucible embodying the principles of the present invention;

Figure 3:
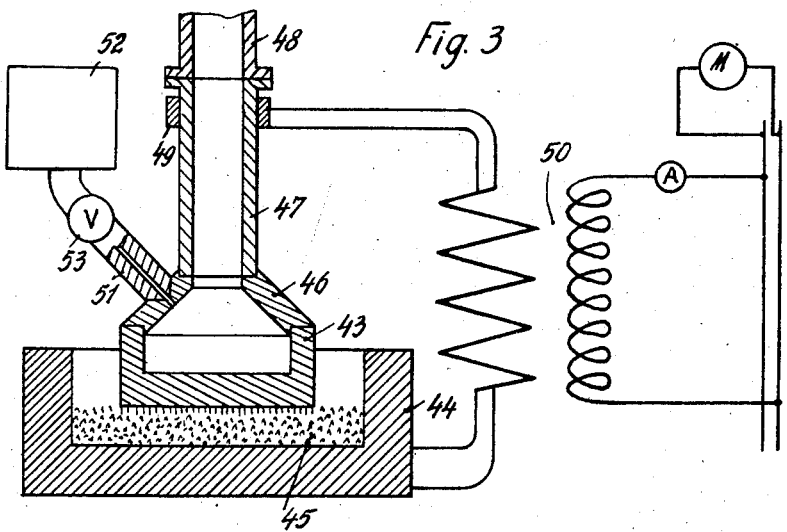
Fig. 3 is a modified construction of a furnace according to the invention.

As shown diagrammatically in Fig. 1, the furnace or crucible 1, consisting of sheet iron, has a bottom 2 and is provided at the upper end with an outlet socket 3 which is connected with a chamber 4 for collecting the developed gases or vapors. The bottom 2 of the furnace 1 is covered by a plate 5 of graphite or the like, the upper surface of which is substantially even, or at least so constructed as to prevent a greater accumulation or collection of particles or drops of the material or substances to be treated. A tube 6 extends through the walls of the crucible or furnace 1 and this tube is connected to a storage container or reservoir 7 for the material or substance to be treated. The tube 6 is provided with a shutoff valve 8. Moreover, two electrodes 9 pass through the walls of the crucible 1, and between these electrodes an electric arc 10 is formed in the interior of the crucible 1. A suitable source of current 11 is connected to the electrodes 9 by a circuit 12 in which an ammeter 13 is arranged.

The container or reservoir 7 is filled with granular material, if such material is to be treated, or the container is filled with liquid metal. By opening the shutoff valve 8 the material is fed into the furnace 1 in very small amounts at a time, preferably in form of individual grains or drops 14. In the very moment the drop 14 or the grain, introduced by way of the tube 6, reaches the plate 5 of the highly heated crucible 1, this grain or drop is completely surrounded by the vapor 15 developed in the crucible in such a manner, that said grain or drop in fact is somewhat lifted from the upper surface of the plate 5. Due to the fact that the drop 14 is surrounded by the vapor 15, the well known Leidenfrost phenomenon is obtained. The drop 14 then is quickly moved to and fro in the furnace or crucible 1. The developed vapors finally pass through the socket 3 of the furnace or crucible 1 into the chamber 4 from where they are conducted to any desired place of use. If granular material is to be treated, the same effect is obtained, if the material is fed into the crucible in such a manner as to reach the surface of the plate 5 in the form of individual grains.

Fig. 2 shows a construction of a furnace or crucible for practically carrying out the new process. In this construction, the casing 16, consisting preferably of sheet iron, is lined with a refractory material 17 in which the crucible 18 is embedded. The furnace or crucible 18 is closed at the upper end by a conical portion 19. Into the crucible 18 extend three tubes 20 one of which only is shown in the drawings for the sake of clearness. Each of the tubes 20 is fixed in position by means of a bracket 21 and serves the purpose of holding an electrode 22 which extends through the conical portion 19 into the interior of the furnace or crucible 18. In the drawing one of the electrodes 22 is shown in full lines, while the second one is shown in dotted lines only and the third one is not shown at all. Each of these electrodes 22 is, by insulations 23, electrically insulated with regard to the tube 20, the bracket 21 and the casing 16. From the conical portion 19 a tube 24 leads to a tube 25 which may be connected to a place of use for the gases or vapors developed in the interior of the crucible 18. Extending through the casing-wall 16, the refractory lining 17 and the conical portion 19 of the crucible 18 is a tube 26 the upper end of which carries a transparent plate 27 allowing observation of the interior of the crucible during operation. Exteriorly of the casing 16 a tube 28 is provided which opens into the tube 26 and is connected to the storage tank or container 29 for the material to be treated. The tube 28 is provided with a control valve 30. Into the bottom of the crucible 18 a tube 31 is inserted which slightly extends over the upper surface of a plate 32 consisting of graphite or the like. The tube 31 is open at the upper end and its lower end is connected to a funnel-like opening 33 of a tube 34 extending through a bushing 35 and the bottom 36 of the casing 16 into a tank 37 fixed to a socket 38 of the bottom 36. A discharge tube 39 leads from the tank 37. Journaled in brackets 40 fixed to the bottom 36 of the casing 16 are wheels 41 allowing movement of the entire furnace or crucible from one place to another for the purpose of connecting same as desired to one or the other device in which the vapors of the metals, metal alloys, etc., produced in the crucible may be subjected to the desired treatments.

The operation of this furnace or crucible is fundamentally the same as that described in connection with Fig. 1. Should for any reason too great an amount of the material to be treated be fed at a time into the furnace or crucible 18 the surplus of material flows off by way of the tube 31 and reaches the tank 37 by way of the tube 34. The material may be discharged from the tank 37 through the tube 39 and used again in any suitable manner. The transparent plate 27 and the tube 26 allow observing of the interior of the crucible 18, and, therefore, of the operation of the latter, so that the feeding of the material to be treated from the storage tank or container 29 to the crucible may be controlled in any suitable manner.

If instead of granular material, liquid metal or metal alloys, for instance iron, are to be vaporized, the iron is fed into the crucible 18 preferably in form of a wire. The storage tank 29 and the valve 30 controlling the feed of the granular or liquid material or substance to be treated are then replaced by other devices which need not be shown or described, as they are well known to men skilled in the art.

In some cases the devices controlling the feed of the substances to be vaporized may be so constructed, that they are automatically adjusted in accordance with the proceeding of the vaporization process. This control may for instance be effected by means of relays operating in dependence on the temperature prevailing in the crucible, the electrical load, the level of the substance or other factors adapted to be indicated by measuring instruments.

The tube 34 may consist of graphite and is preferably heated by electric current to a suitable temperature. The tank 37 is also preferably heated. The means required for this purpose are not shown in the drawings as they do not form part of the present invention.

As mentioned already above, the upper surface of the plate 32 is preferably even. This plate, preferably consisting of graphite, is arranged in a horizontal plane and its upper surface may have small depressions which allow a limitation of individual drops of the liquid which, however, are so chosen, that heap- or pond-like accumulations or collections of a plurality of drops in one and the same depression are impossible.

The electrodes 22 are connected in star connection with the coils of a three-phase current transformer 42. The star-point is connected to the casing 16 of the furnace or crucible 18 and grounded. The primary current is supplied from a three-phase current line and its tension is controlled by control means well known in the art.

The electrodes may also be connected in another manner or be supplied with two-phase current or direct current. If desired, one electrode only may be provided in which case the crucible 18 or the plate 32 serves as counter-electrode.

With certain of these connections rectifier effects may occur and, therefore, it may be preferable to connect an instrument, indicating and measuring direct current, in the circuit leading to the crucible or furnace 18.

If copper is to be vaporized in the apparatus according to the invention, the operation is as follows if the transformer has a capacity of 200 kilowatts.

When by switching on the current and forming the electric arc the furnace or crucible 18 is heated sufficiently high, liquid copper is fed into the crucible from the storage tank or reservoir 29 in an amount sufficient to cover the bottom of the crucible or the upper surface of the graphite plate 32, if such a plate is used, with a very thin layer of liquid copper. The electrical load is then increased so far, that the copper vaporizes which, as shown by experiments, takes place slowly only as long as a coherent supply of liquid copper is present in the crucible. As soon as the liquid copper fed into the crucible is about exhausted and thereby the bottom of the crucible or the upper surface of the plate 32 begins to be free of copper to be treated, a surprising increase of the rate of vaporization results. Simultaneously the well known Leidenfrost phenomenon appears, that is to say, the greater and smaller drops still present are so quickly vaporized upon the plate 32, that they are somewhat lifted by the vapor from the plate. The individual drops are completely enveloped by vapor and are quickly moved to and fro in the crucible and finally splashed. Due to the extremely powerful heat radiation in the interior of the crucible, the drops are very quickly solved and vaporized, and the vapor is heated to a temperature far above the boiling point. This is still favored by the fact, that the vapors developed are compelled to flow through the electric arc.

As soon as the Leidenfrost phenomenon comes to action and the vaporization starts, care is to be taken that fresh liquid copper is supplied to the crucible or furnace in an amount equal to that vaporized at a time in the furnace. If these conditions are maintained, the most favorable relations for the vaporization are obtained. The valve 30 controlling the feed of the material is of course, opened sufficiently wide for this purpose.

The amount of material required to obtain correct operating conditions may be calculated from the thermal constants and the transformer load. If, as supposed, the transformer has a capacity of 200 kilowatts, about 85% of this is liberated in the vaporization space and results in 144 200 calories per hour. To heat the copper to the smelting point, 108 calories per kg. are required, whereas 135 calories are necessary for heating the copper to a temperature of 2100° C., 42 calories are required for the melting, 1100 calories for vaporization and about 150 calories for superheating to 500° C.

Theoretically the vaporization space remains in heat equilibrium if 146 200/1536 equal to 93.5 kg. of copper are supplied per hour in an uniform stream of flow. In practice, the amount fed is somewhat below the weight given above.

The control of the amount of material fed into the furnace offers no difficulties, because the process automatically is stabilized to a certain degree, if the transformer operates somewhat elastically. If too much copper is introduced, the electric arc consumes more energy and, therefore, a greater amount of copper is vaporized. Porosities and bores in the plate 32, or generally a sponge-like structure of the plate facilitate the stability and controllability of the operation.

The fact that the Leidenfrost phenomenon comes to action simultaneously with a strong increase of the rate of vaporization is probably due to the fact, that the rests of the molten metal are thermically isolated from the bottom of the furnace or crucible by the metal vapor surrounding or embedding them. Consequently the heat supply by convection from the bottom decreases, but simultaneously also the withdrawal of heat, because the vapors are not as good a heat conductor as the liquid. Compared with their mass the isolated drops have a great surface and absorb great amounts of radiating heat, the intensity of which in the hollow space of the crucible increases with the biquadrate of the absolute temperature, whereas the withdrawal of heat by convection increases slower with the temperature. It is immaterial whether or not the surprising increase in the rate of vaporization is caused by the Leidenfrost phenomenon. In any case the occurrence of the Leidenfrost phenomenon is a reliable criterion of the fact, that the crucible operates under correct conditions to obtain an intensive vaporization of the metal.

Other metals and metal alloys may also be vaporized by means of the present invention, provided, that in the time unit so much of the substance to be vaporized only is fed into the vaporization space always as is vaporized in the same, and that the temperature of the space is maintained above that at which the Leidenfrost phenomenon begins to become effective.

The quantities or amounts of the substances to be treated and to be fed may be calculated from the thermal constants of the respective substance and the arc load. If the figures required for the calculation are only approximately known, they may be estimated and corrected during operation.

The process according to the invention may also be used for treating other substances, for instance metal compounds, as oxides, sulphides a. s. o., even if these substances are directly converted from the solid state into the vapor state. For instance, ores of nickel, copper, zinc and other metals have often been decomposed according to the new process into their constituents by converting ores, as they come from the pit, by well known means into a fine dry powder which by drizzling it through a supply pipe is slowly and preferably uniformly fed into the interior of the furnace. Each individual ore particle then vaporizes practically for itself and a superheated vapor mixture results from the constituents of the ore. This vapor mixture is then, preferably outside the furnace decomposed or separated into its constituents and cooled, the individual constituents being obtained in separate vessels or tanks as a fine powder. As is well known, many of these powders have the property that, at the temperatures coming into consideration, they do not fuse but sublimate. In treating such substances a variety of the Leidenfrost phenomenon occurs with solid particles. These substances similarly behave as drops and vaporize so quickly, that they are lifted from their support by the vapor layer surrounding them. These particles, however, are not irregularly moved to and fro upon their support as is the case with liquids. A temperature may, however, be found beyond which the rate of the vaporization of these substances quickly increases, if care is taken that, by a correct adjustment of the rate of feeding of the material to be vaporized into the vaporization space, no greater quantities or amounts of the material are allowed to accumulate upon the surface of the crucible and to reduce the temperature of these points.

It may be of advantage to superheat the metal vapors, leaving the vaporization space, by means of additional heating surfaces, for instance by electrically heated tubes, plates or the like of graphite.

If necessary, all parts of the device for carrying out the new process which must be heated to high temperatures are protected against burning by introducing neutral gases, for instance, nitrogen, as long as the gas produced in the furnace is not able to warrant this protection.

The process of vaporization is carried out in the device described at about atmospheric pressure. It may, however, also be of advantage to carry out the process under higher pressure and in some cases also under lower pressure. For this purpose the furnace or crucible and the spaces connected thereto are sufficiently sealed against the atmosphere and the required vacuum and pressure respectively is obtained by means of suction pumps and pressure pumps respectively.

The various devices and operations required for the purpose are sufficiently known to the man skilled in the art, so that a more detailed description of same appears to be unnecessary here.

The process according to the invention shown in Fig. 3 consists of a crucible 43 of graphite or the like which is heated by Joule heat. For this purpose the lower portion of the crucible 43 is embedded in a trough 44 consisting of conductive material, which trough is filled with small coal 45. From the conical upper portion 46 of the crucible extends upwardly a tube 47 of conducting material which is connected to another tube 48. The upper end of the tube 47 is surrounded by a pipe clip 49 by means of which the current of a transformer 50 is conducted to the tube 47 forming the upper part of the crucible 43, so that the latter is intensively heated. A tube 51 connected to a storage tank or reservoir 52 and provided with a control valve 53 is connected to the upper part 46 of the crucible 43.

The operation of this device is similar to that described in connection with the construction shown in Fig. 2.

Figure 4:
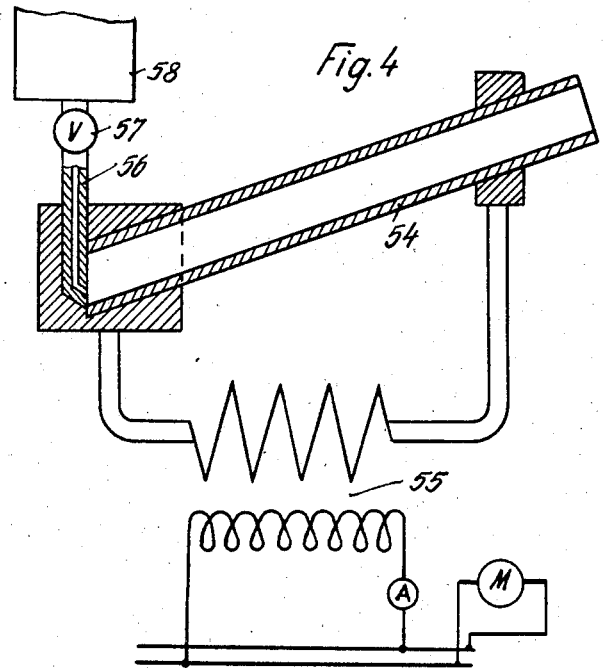
Fig. 4 shows a section through another modified furnace according to the invention.

The crucible shown in Fig. 4 consists of a tube 54 of graphite or the like which is arranged in an inclined position and is also heated with Joule heat by current of a transformer 55. A tube 56 provided with a control valve 57 is connected to the closed end of the tube 54 and to a storage tank or reservoir 58 for the material to be treated. With this construction also the temperature is raised to such a degree, that the material, fed into the device, splashes upon the hot wall of the tube 54, is converted into vapor and further superheated on the way to the discharge end of the tube 54 which may be connected to a place of use of the vapors. Due to the inclined arrangement of the tube 54 all drops not immediately vaporized roll back again and again until they are completely vaporized.

Figure 5:
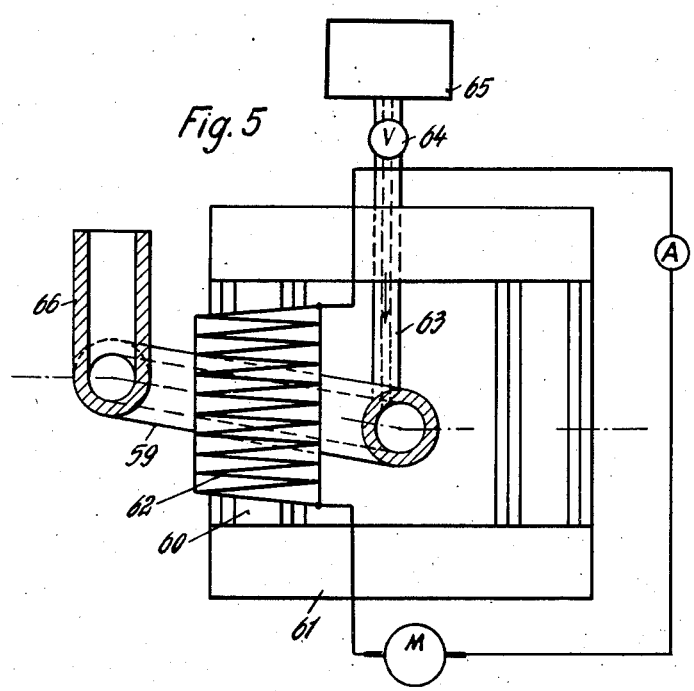
Fig. 5 is a sectional view of a further modification of a crucible according to the invention.
Figure 6:
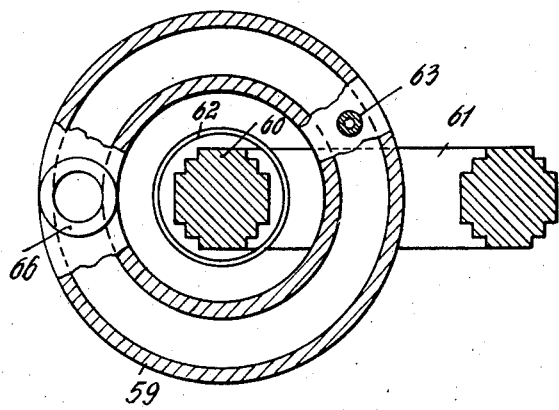
Fig. 6 is a horizontal section through the furnace shown in Fig. 5.

According to Figs. 5 and 6 the crucible or furnace consists of a hollow ring 59 of graphite or the like which surrounds a shank 60 of a transformer core 61 carrying the coil 62. The ring 59 forms the secondary coil and is, during operation of the transformer, traversed by heavy currents, with the result that the ring 59 is heated to very high temperatures. A tube 63 provided with a control valve 64 is connected to the ring 59 and to a storage tank or reservoir 65 for the material to be treated. The vapor produced in the ring 59 flows through the tube 66 and is led to a suitable place of use.

It has been found that in carrying out the process of the present invention rectifier effects may occur. By means of a direct current indicator connected to the circuit supplying current to the furnace or crucible, these effects may be observed and utilized for control purposes.

The metal powder obtained by the new process is characterized by the fact, that all of the primary particles of the powder are of a size near the limit of microscopical visibleness and that the secondary particles are extremely loose flocks also of microscopical smallness.

EXAMPLES

| | Calories |
|---|---|
| Supposed furnace efficiency: 200 kw. @ 860 calories | 172,000 |
| 15% loss of heat due to transfer to surrounding atmosphere | 25,800 |
| Available heat value in the furnace space | 146,200 |

To maintain equilibrium of heat the process may be carried out according to the following examples:

1. Copper

| | Calories |
|---|---|
| Up to 1080° | 108 |
| 1080°–2100° | 153 |
| Latent heat of fusion | 142 |
| Vaporization heat | 1110 |
| Supposed heat for superheating to the vapor state to about 500° | 150 |
| Total | 1,563 |

Available heat 146,200 calories divided by the heat value per kg. of copper 1,563 calories equal to 93.5 kg. per hour as highest admissible quantity of the supply.

2. Zinc

| | Calories |
|---|---|
| 0–420° | 42 |
| 420–918° | 60 |
| Latent heat of fusion | 28 |
| Vaporization heat | 436 |
| Supposed superheating heat | 100 |
| Total | 666 |

Highest admissible quantity of supply calculated as above: 146,200 divided by 666=219.5 kg. per hour.

3. Tin

| | Calories |
|---|---|
| 0–232° | 13.5 |
| 232–2270° | 15.5 |
| Latent heat of fusion | 13.8 |
| Vaporization heat | 621.0 |
| Supposed superheating heat | 38.0 |
| Total | 701.8 |

4. Nickel

| | Calories |
|---|---|
| 0–1452° | 218 |
| 1452°–3075° | 324 |
| Latent heat of fusion | 70.4 |
| Vaporization heat | 1490.0 |
| Supposed superheating heat | 40.0 |
| Total | 2142.4 |

Highest admissible quantity of supply calculated as above: 146,200 divided by 2142.4=68.2 kg. per hour.

5. Lead

| | Calories |
|---|---|
| 0–230° | 8.74 |
| 230–1560° | 66.50 |
| Latent heat of fusion | 5.86 |
| Vaporization heat | 220.00 |
| Supposed superheating heat | 30.00 |
| Total | 331.10 |

Highest admissible quantity of supply calculated as above: 146,200 divided by 331.10=441.5 kg. per hour.

6. Zinc oxide

| | Calories |
|---|---|
| 0–1850° | 196 |
| Latent heat of fusion (does not fuse but sublimates). | |
| Vaporization heat (sublimation heat) | 959 |
| Supposed superheating heat | 100 |
| Total | 1,255 |

Highest admissible quantity of supply calculated as above: 146,200 divided by 1,255=116 kg. per hour.

7. Tin dioxide, cassiterite

| | Calories |
|---|---|
| 0–2000° | 234 |
| Latent heat of fusion (does not fuse, but sublimates). | |
| Vaporization heat (sublimation heat) | 590 |
| Supposed superheating heat | 70 |
| Total | 894 |

Highest admissible quantity of supply calculated as above: 146,200 divided by 894=165.5 kg. per hour.

8. Zinc sulphide, zinc blende

| | Calories |
|---|---|
| 0–1350° | 216 |
| Supposed sublimation heat | 950 |
| Supposed superheating heat | 90 |
| Total | 1,256 |

Highest admissible quantity of supply calculated as above: 146,200 divided by 1,256=116 kg. per hour.

9. Lead sulphide, galena

| | Calories |
|---|---|
| 0–1344° | 80.6 |
| Supposed melting and vaporization heat | 250 |
| Supposed superheating heat | 30 |
| Total | 360.6 |

Highest admissible quantity of supply calculated as above: 146,200 divided by 360.6=405.4 kg. per hour.

In practice the quantity of supply must, of course somewhat be kept below the theoretically calculated quantities.

The present application is a division of my copending application, Serial No. 146,748, now Patent #2,207,746, relating to an Apparatus suitable for vaporizing metals.

Although the present invention has been described in conjunction with certain preferred embodiments, variations and modifications may be made therein as those skilled in the art will readily understand. Such variations and modifications are to be considered within the purview of the specification and the scope of the appended claims.

I claim:

1. A process for vaporizing metals, metal alloys, metal compounds, and other solid mineral substances to produce finely divided material which comprises feeding the substance to be vaporized in individual drops, particles and the like, onto a substantially smooth, refractory and heat radiating vaporization surface in a closed, highly-heated vaporization chamber, the drops and the like being fed to said surface at such rates and the temperature of the chamber being maintained so high that vapor is formed around a drop as soon as it is fed onto the refractory surface, whereby substantially the entire surface of the material to be vaporized is subjected to heat by radiation and said material is thereby converted into the vapor state, in which condition said material is discharged from the vaporization chamber and condensed.

2. A process for vaporizing metals, metal alloys, metal compounds and the like which comprises introducing a metal, metal alloy, metal compound and the like into a closed reaction chamber onto a heat radiating and vaporizing surface heated to a temperature above the vaporizing temperature of said metal and the like, heating said metal and the like as substantially discrete particles on said vaporizing surface until said metal and the like have been converted into the vapor state, withdrawing said vapors from said chamber substantially without condensation and condensing said vapors.

3. A process for vaporizing and gasifying metals, metal alloys, metal compounds and the like to produce finely divided material which comprises establishing a pool of molten metal to be vaporized, introducing said molten metal and the like onto a highly heated, heat radiating vaporizing surface within a vapor tight chamber in amounts equivalent to that being vaporized, heating said metal as discrete particles at temperatures appreciably above the vaporizing temperature of the material being treated to vaporize said material, withdrawing said vapors substantially without condensation and condensing said vapors.

4. A process for vaporizing and gasifying materials, such as metals, metal alloys, metal compounds and the like to produce finely divided material, which comprises establishing a pool of molten metal, introducing said molten metal into a vapor tight chamber having a heat radiating and vaporizing surface therein in such quantity as to form a thin liquid film on said vaporizing surface, heating said vaporizing surface until the major portion of said thin liquid film has been vaporized, introducing further amounts of said metal into said chamber and onto said radiating surface at a rate substantially equivalent to the rate at which said material is vaporized, withdrawing vapors from said chamber substantially without condensation and condensing said vapors.

5. A process for vaporizing and gasifying materials including metals, metal alloys, metal compounds and the like to produce finely divided material which comprises feeding a material to be vaporized onto a heat radiating and vaporizing surface, heating said vaporizing surface to a temperature at least 100° C. above the vaporizing temperature of said material while said material is in the form of discrete particles to vaporize said material, withdrawing said vapors substantially without condensation and condensing said vapors.

6. A process for vaporizing and gasifying materials including metals, metal alloys, metal compounds and the like to produce finely divided materials which comprises introducing a material to be vaporized into a vapor-tight chamber having a non-oxidizing atmosphere and directly onto a highly-heated vaporizing surface, heating said material in the form of discrete particles to a temperature substantially above the vaporizing temperature of said material and to a temperature at which the Leidenfrost phenomenon becomes effective to vaporize said material, withdrawing said vapors and condensing said vapors.

RUDOLF MAIER.